US007411186B2

(12) United States Patent
Mordehai

(10) Patent No.: US 7,411,186 B2
(45) Date of Patent: Aug. 12, 2008

(54) MULTIMODE ION SOURCE WITH IMPROVED IONIZATION

(75) Inventor: Alexander Mordehai, Santa Clara, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 393 days.

(21) Appl. No.: 11/314,876

(22) Filed: Dec. 20, 2005

(65) Prior Publication Data

US 2007/0138406 A1 Jun. 21, 2007

(51) Int. Cl.
*B01D 59/44* (2006.01)
*H01J 49/00* (2006.01)

(52) U.S. Cl. ................ 250/288; 250/423 P; 250/423 R; 250/424; 250/425; 250/427; 250/281; 250/282

(58) Field of Classification Search ................ 250/288, 250/42 P, 423 R, 424, 281, 282, 425, 427
See application file for complete search history.

(56) References Cited

U.S. PATENT DOCUMENTS 6,646,257 B1 * 11/2003 Fischer et al. ............... 250/288

OTHER PUBLICATIONS

C. Perazolli et al., "Benzene-assisted atmospheric-pressure chemical ionization: a new liquid chromatography/mass spectrometry approach to the analysis of selected hydrophobic compounds", Rapid Communications in Mass Spectrometry, (2005), vol. 19, pp. 461-469.

* cited by examiner

*Primary Examiner*—Jack I. Berman
*Assistant Examiner*—Meenakshi S Sahu

(57) ABSTRACT

A multimode ionization source with improved ionization characteristics that comprises an electrospray ionization source for providing a charged aerosol, an atmospheric pressure chemical ionization (APCI) source including a corona needle having an end positioned downstream from the electrospray ionization source for producing a discharge that further ionizes the charged aerosol, an assist gas inlet positioned adjacent to the corona needle for providing assist gas, the assist gas facilitating ionization of the charged aerosol by the corona discharge, and a conduit having an orifice for receiving ions from the charged aerosol.

23 Claims, 6 Drawing Sheets

MULTIMODE ION SOURCE WITH IMPROVED IONIZATION

FIELD OF THE INVENTION

The present invention relates generally to the field of mass spectrometry and more particularly relates to a multimode ion source that employs an assist gas to improve ionization efficiency.

BACKGROUND INFORMATION

Mass spectrometers work by ionizing molecules and then sorting and identifying the molecules based on their mass-to-charge (m/z) ratios. Two key components in this process include the ion source, which generates ions, and the mass analyzer, which sorts the ions. Several different types of ion sources are available for mass spectrometers. Each ion source has particular advantages and is best suited for use with different classes of compounds. Different types of mass analyzers are also used. Each type has advantages and disadvantages depending upon the type of information needed.

Much of the advancement in liquid chromatography/mass spectrometry (LC/MS) over recent years has been in the development of atmospheric pressure ionization (API) sources and techniques that ionize analyte molecules and separate the resulting ions from the mobile phase. Earlier LC/MS systems performed at sub-atmospheric pressures or under partial vacuum, whereas API occurs at atmospheric pressure.

The introduction of API techniques has greatly expanded the number of compounds that can be successfully analyzed using LC/MS. In API techniques, analyte molecules are first ionized at atmospheric pressure. The analyte ions are then spatially and electrostatically separated from neutral molecules. Common API techniques include: electrospray ionization (ESI), atmospheric pressure chemical ionization (APCI) and atmospheric pressure photoionization (APPI). Electrospray ionization is the oldest technique and relies in part on chemical effects to generate analyte ions in solution before the analyte reaches the mass spectrometer. The LC eluent is sprayed (nebulized) into a chamber at atmospheric pressure in the presence of a strong electrostatic field and heated drying gas. The electrostatic field charges the LC eluent and the analyte molecules. The heated drying gas causes the solvent in the droplets to evaporate. As the droplets shrink, the charge concentration in the droplets increases. Eventually, the repulsive force between ions with like charges exceeds the cohesive forces and the ions are ejected (desorbed) into the gas phase. The ions are attracted to and pass through a capillary or sampling orifice into the mass analyzer. Some gas-phase reactions, mostly proton transfer and charge exchange, can also occur between the time ions are ejected from the droplets and the time they reach the mass analyzer.

Electrospray is particularly useful for analyzing large biomolecules such as proteins, oligonucleotides, peptides etc. The technique can also be useful for analyzing polar smaller molecules such as benzodiazepines and sulfated conjugates. Other compounds that can be effectively analyzed using electrospray include salts and organic dyes.

Large molecules often acquire more than one charge. Multiple charging provides the advantage of allowing analysis of molecules as large as 150,000 u even though the mass range (or more accurately mass-to-charge range) for a typical LC/MS instrument is around 3000 m/z. When a large molecule acquires many charges, a mathematical process called deconvolution may be used to determine the actual molecular weight of the analyte.

A second common technique performed at atmospheric pressure is atmospheric pressure chemical ionization (APCI). In APCI, the LC eluent is sprayed through a heated vaporizer (typically 250-400° C.) at atmospheric pressure. The heat vaporizes the liquid and the resulting gas phase solvent molecules are ionized by electrons created in a corona discharge. The solvent ions then transfer the charge to the analyte molecules through chemical reactions (chemical ionization). The analyte ions pass through a capillary or sampling orifice into the mass analyzer. APCI has a number of important advantages. The technique is applicable to a wide range of polar and nonpolar molecules. The technique rarely results in multiple charging like electrospray and is, therefore, particularly effective for use with molecules of less than 1500 u. However, APCI may be less useful technique than electrospray in regards to large biomolecules that may be thermally unstable. APCI is used with normal-phase chromatography more often than electrospray because the analytes in this case are usually nonpolar.

Atmospheric pressure photoionization (APPI) for LC/MS is a relatively new technique. As in APCI, a vaporizer converts the LC eluent to the gas phase. A discharge lamp generates photons in a narrow range of ionization energies. The range of energies is carefully chosen to ionize as many analyte molecules as possible while minimizing the ionization of solvent molecules. The resulting ions pass through a capillary or sampling orifice into the mass analyzer. APPI is applicable to many of the same compounds that are typically analyzed by APCI. It shows particular promise in two applications, highly nonpolar compounds and low flow rates (<100 ul/min), where APCI sensitivity is sometimes reduced. In each case, the optimal ionization technique depends to a great extent on the nature of the analyte(s) and the separation conditions.

Each of the techniques described above ionizes molecules through a different mechanism. Unfortunately, none of these techniques are universal sample ion generators. While in some circumstances, the lack of universal ionization could be seen as a potential advantage, it presents a serious disadvantage to the analyst responsible for rapid analysis of samples that are widely divergent. An analyst faced with very limited time and a broad array of numerous samples to analyze is interested in an ion source capable of ionizing as many kinds of samples as possible with as few instrumental adjustments as possible.

Attempts have been made to improve sample ionization coverage by the use of rapid switching between positive and negative ion detection. Rapid positive/negative polarity switching does result in an increase in the percentage of compounds detected by any API technique. However, it does not eliminate the need for more universal API ion generation.

In addition, multimode sources, which include more than one ionization mechanism, have been devised. U.S. Pat. No. 6,646,257 describes a multimode source in which an ESI apparatus is combined with either APCI or APPI. The arrangement of two sources together is effective in that the benefits of each source can be combined, but there remains a need to enhance the efficiency of such multimode sources in order to approach the goal of a "universal" ionization source.

SUMMARY OF THE INVENTION

According to one aspect, the present invention a multimode ionization source with improved ionization characteristics that comprises: an electrospray ionization source for providing a charged aerosol; an atmospheric pressure chemical ionization (APCI) source including a corona needle having an end positioned downstream from the electrospray ionization source for producing a discharge that further ionizes the charged aerosol; an assist gas inlet positioned adjacent to the corona needle for providing assist gas, the assist gas facilitating ionization of the charged aerosol by the corona needle discharge; and a conduit having an orifice for receiving ions from the charged aerosol.

In another aspect, the present invention provides a mass spectrometer that comprises a multimode ionization source including an electrospray ionization source for providing a charged aerosol, an atmospheric pressure chemical ionization (APCI) source including a corona needle having an end positioned downstream from the electrospray ionization source for producing a discharge that further ionizes the charged aerosol, an assist gas inlet positioned adjacent to the corona needle for providing assist gas, the assist gas facilitating ionization of the charged aerosol by the corona needle discharge, and a conduit having an orifice for receiving ions from the charged aerosol. The mass spectrometer also includes a mass analyzer positioned at a downstream end of the conduit and receiving ions therefrom and a detector downstream from the mass analyzer for detecting ions received from the mass analyzer.

In yet another aspect, the present invention provides a method of producing ions using a multimode ionization source comprising producing a charged aerosol by electrospray ionization, guiding the charged aerosol downstream using electrodes, providing an assist gas in the vicinity of a corona needle downstream from the electrodes, and ionizing the charged aerosol using a discharge produced by the corona needle facilitated by the assist gas.

Various implementations, variations and embodiments of these aspects of the present invention are described below.

DETAILED DESCRIPTION

Figure 1:
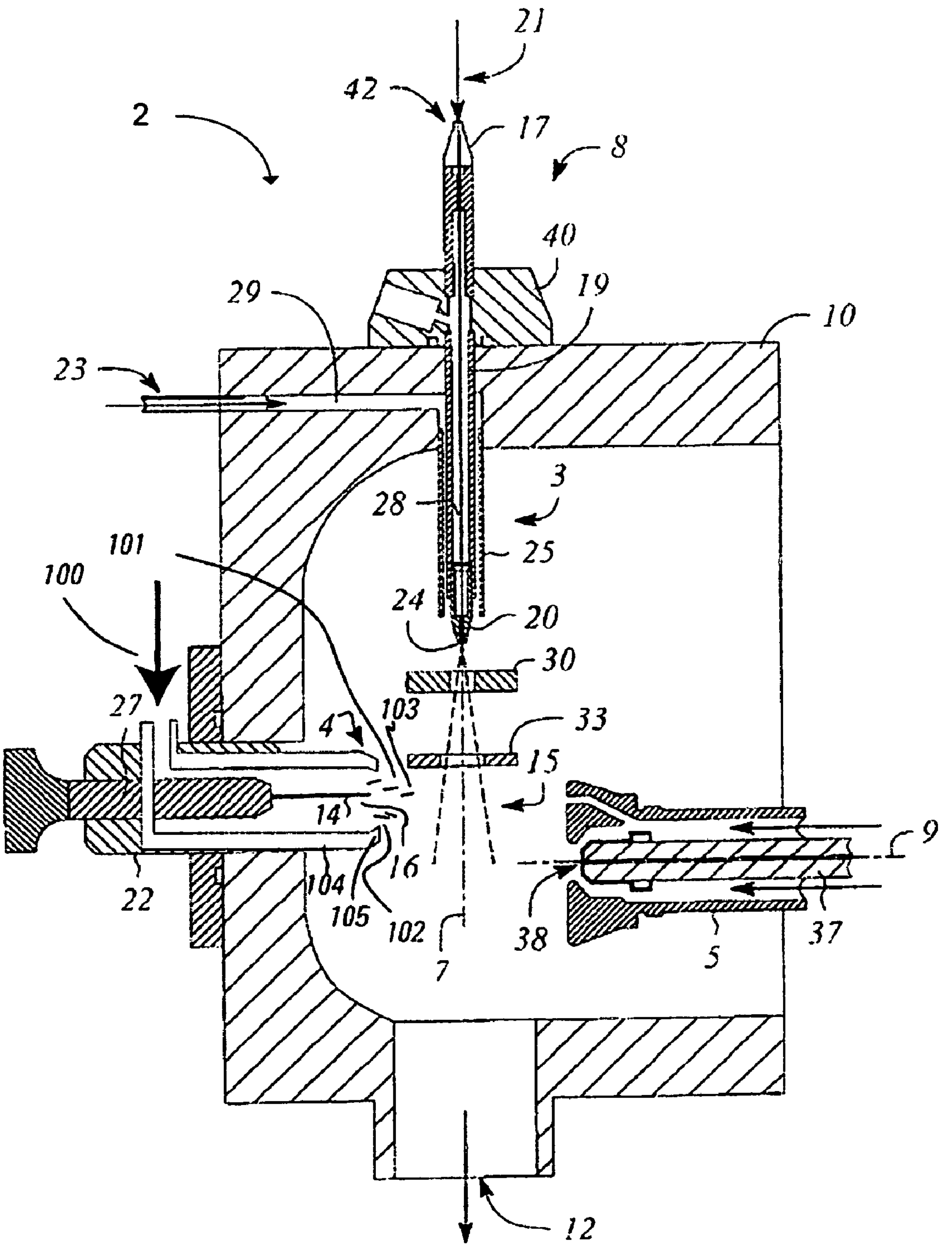
FIG. 1 shows an exemplary embodiment of a multimode ion source according to the present invention.

Before describing the invention in detail, it must be noted that, as used in this specification and the appended claims, the singular forms "a", "an," and "the" include plural referents unless the context clearly dictates otherwise. Thus, for example, reference to "a conduit" includes more than one "conduit". Reference to an "electrospray ionization source" or an "atmospheric pressure ionization source" includes more than one "electrospray ionization source" or "atmospheric pressure ionization source". In describing and claiming the present invention, the following terminology will be used in accordance with the definitions set out below.

The term "adjacent" means near, next to or adjoining. Something adjacent may also be in contact with another component, surround (i.e. be concentric with) the other component, be spaced from the other component or contain a portion of the other component. For instance, a "drying device" that is adjacent to a nebulizer may be spaced next to the nebulizer, may contact the nebulizer, may surround or be surrounded by the nebulizer or a portion of the nebulizer, may contain the nebulizer or be contained by the nebulizer, may adjoin the nebulizer or may be near the nebulizer.

The term "conduit" refers to any sleeve, capillary, transport device, dispenser, nozzle, hose, pipe, plate, pipette, port, orifice, orifice in a wall, connector, tube, coupling, container, housing, structure or apparatus that may be used to receive or transport ions or gas.

The term "corona needle" refers to any conduit, needle, object, or device that may be used to create a corona discharge or a high pressure glow discharge.

The term "molecular longitudinal axis" refers to the theoretical axis or line that can be drawn through the region having the greatest concentration of ions in the direction of the spray. The above term has been adopted because of the relationship of the molecular longitudinal axis to the axis of the conduit. In certain cases a longitudinal axis of an ion source or electrospray nebulizer may be offset from the longitudinal axis of the conduit (the theoretical axes are orthogonal but not aligned in 3 dimensional space). The use of the term "molecular longitudinal axis" has been adopted to include those embodiments within the broad scope of the invention. "Orthogonal" is defined as perpendicular to or at approximately a 90 degree angle. For instance, the "molecular longitudinal axis" may be orthogonal to the axis of a conduit. The term substantially orthogonal is defined as 90 degrees ±20 degrees. The invention, however, is not limited to those relationships and may comprise a variety of acute and obtuse angles defined between the "molecular longitudinal axis" and longitudinal axis of the conduit.

The term "nebulizer" refers to any device known in the art that produces small droplets or an aerosol from a liquid.

The term "first electrode" refers to an electrode of any design or shape that may be employed adjacent to a nebulizer or electrospray ionization source for directing or limiting the plume or spray produced from an ESI source, or for increasing the field around the nebulizer to aid charged droplet formation.

The term "second electrode" refers to an-electrode of any design or shape that may be employed to direct ions from a first electrode toward a conduit.

The term "drying device" refers to any heater, nozzle, hose, conduit, ion guide, concentric structure, infrared (IR) lamp, u-wave lamp, heated surface, turbo spray device, or heated gas conduit that may dry or partially dry an ionized vapor. Drying the ionized vapor is important in maintaining or improving the sensitivity of the instrument.

The term "ion source" or "source" refers to any source that produces analyte ions.

The term "ionization region" refers to an area between any ionization source and the conduit.

The term "electrospray ionization source" refers to a nebulizer and associated parts for producing electrospray ions. The nebulizer may or may not be at ground potential. The term should also be broadly construed to comprise an apparatus or device such as a tube with an electrode that can discharge charged particles that are similar or identical to those ions produced using electrospray ionization techniques well known in the art.

The term "atmospheric pressure ionization source" refers to the common term known in the art for producing ions. The term has further reference to ion sources that produce ions at ambient temperature and pressure ranges. Some typical ionization sources may include, but not be limited to electrospray, APPI and APCI ion sources.

The term "detector" refers to any device, apparatus, machine, component, or system that can detect an ion. Detectors may or may not include hardware and software. In a mass spectrometer the common detector includes and/or is coupled to a mass analyzer.

The term "sequential" or "sequential alignment" refers to the use of ion sources in a consecutive arrangement. Ion sources follow one after the other. This may or may not be in a linear arrangement.

The invention is described with reference to the figures. The figures are not to scale, and in particular, certain dimensions may be exaggerated for clarity of presentation.

FIG. 1 shows a multimode ion source according to an embodiment of the present invention. As shown, the multimode ion source 2, including a plurality of ionization mechanisms, includes a first ion source 3 and a second ion source 4 downstream from the first ion source 3. The first ion source 3 may be separated spatially or integrated with the second ion source 4. The first ion source 3 may also be in sequential alignment with the second ion source 4. Sequential alignment, however, is not required. When the first ion source 3 is in sequential alignment with second ion source 4, the ions and non-ionized analytes pass from the first ion source 3 to the second ion source 4. The first ion source 3 may comprise an atmospheric pressure ion source and the second ion source 4 may also comprise one or more atmospheric pressure ion sources.

In a particular embodiment, the first ion source 3 may comprise an electrospray apparatus. The electrospray technique typically provides multiply charged species that can be detected and deconvoluted to characterize large molecules such as proteins. The first ion source 3 may be positioned in a number of positions, orientations or locations within the multimode ion source 2. For example, FIG. 1 shows the first ion source 3 in an orthogonal arrangement with respect to a conduit 37 (shown as a capillary) in which the first ion source 3 has a molecular longitudinal axis 7 that is approximately perpendicular to the conduit longitudinal axis 9 of the conduit 37. However, this arrangement is merely one advantageous embodiment and should not to be regarded as limiting the scope of the claimed invention(s).

In multimode ion source 2, the first ion source 3, the second ion source 4 and conduit 37 are enclosed in a single source housing 10. However, it is noted that the source housing 10 is not required. It is anticipated that the ion sources may be placed in separate housings or even be used in an arrangement where the ion sources are not used with the source housing 10 at all. It should be mentioned that although the source is normally operated at atmospheric pressure (around 760 Torr) it can be maintained, more generally, at pressures from about 20 to about 2000 Torr. The source housing 10 has an exhaust port 12 for removal of gases.

Figure 2:
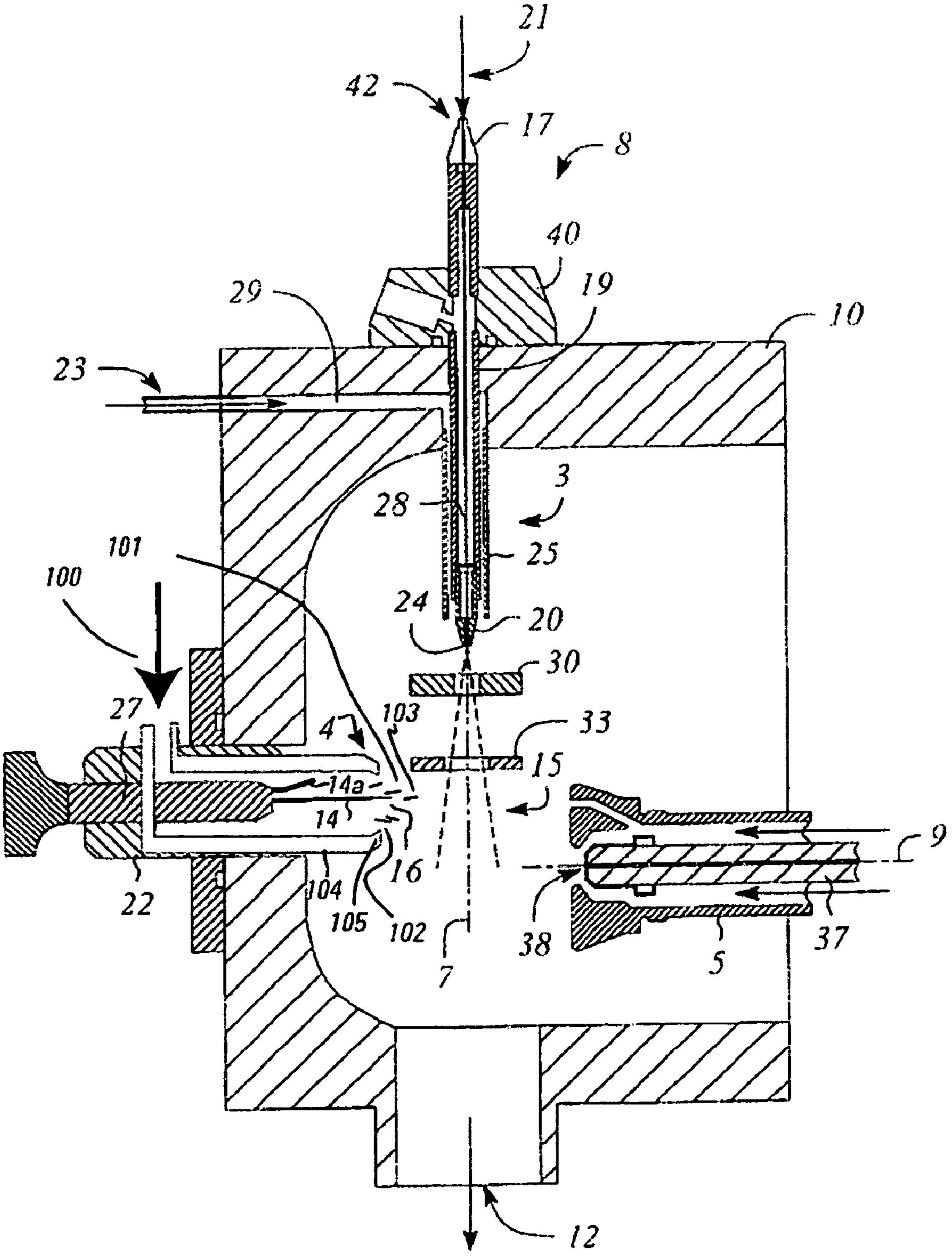
FIG. 2 shows another exemplary embodiment of a multimode ion source according to the present invention that includes multiple APCI corona needles for generating discharges.

In the depicted embodiment, the first ion source 3 comprises a nebulizer 8 and drying device 23. Each of the components of the nebulizer 8 may be separate or integrated with the source housing 10 (as shown in FIGS. 1-3). In the case when the nebulizer 8 is integrated with the source housing 10, a nebulizer coupling 40 may be employed for attaching nebulizer 8 to the source housing 10. The nebulizer 8 includes a nebulizer conduit 19, nebulizer cap 17 having a nebulizer inlet 42 and a nebulizer tip 20. The nebulizer conduit 19 has a longitudinal bore 28 that runs from the nebulizer cap 17 to the nebulizer tip 20 FIG. 1 depicts the conduit in a split design in which the nebulizer conduit 19 is separated into two pieces with bores aligned. The longitudinal bore 28 is designed for transporting sample 21 to the nebulizer tip 20 for the formation of the charged aerosol that is discharged into an ionization region 15. The nebulizer 8 has an orifice 24 for formation of the charged aerosol that is discharged to the ionization region 15. An electric field is established at the nebulizer tip 20 to charge the ESI liquid. The dimensions of the nebulizer tip 20 are typically small enough to generate high local field strength. The nebulizer tip 20 may range from 100 to 300 microns in diameter, for example.

A drying device 23 provides a sweep gas, such as nitrogen, to the charged aerosol produced and discharged from nebulizer tip 20. The sweep gas may be heated and applied directly or indirectly to the ionization region 15 via a sweep gas conduit 25. The sweep gas conduit 25 may be attached or integrated with source housing 10 (as shown in FIG. 1). When sweep gas conduit 25 is attached to the source housing 10, a separate source housing bore 29 may be employed to direct the sweep gas from the sweep gas source 23 toward the sweep gas conduit 25. The sweep gas conduit 25 may comprise a portion of the nebulizer conduit 19 or may partially or totally enclose the nebulizer conduit 19 in such a way as to deliver the sweep gas to the aerosol as it is produced from the nebulizer tip 20.

In the embodiment of FIG. 1, the second ion source 4 comprises an APCI ion source that is enhanced by supplemental assist gas introduction conduit 104, which may deliver a noble gas such as argon or helium. The voltage at the corona needle 14 may be between 500 to 6000 V with about 4000 V being typical for generating a discharge. By addition of the supplemental assist gas 100 around the corona needle it is possible to generate a high number of ions, excited neutrals and photons that all can contribute to the sample ionization by different and complementary mechanisms. For example, energized noble gases drifting out of a discharge region 14, which are typically not ionized, are capable of ionizing most of the organic molecules due to the fact their excitation state energy is above of the ionization potential for the most organic molecules. The energized noble gases thus can transfer their energy to analyte molecules, which are ionized by this transfer; this process is referred to as Penning ionization. In addition, in the case of high pressure glow discharge, it is possible to produce a substantial quantity of high energy photons that can also contribute to sample ionization near the APCI source 4.

The field at the nebulizer is isolated from the voltage applied to the corona needle 14 so that the initial ESI process and the discharge and accompanying chemical ionization processes do not interfere with each other. This can be achieved by the grounding the conductive gas conduit 104. In FIG.1, a nebulizer at ground is employed. This design improves safety and allows the use of a low current power supply (not shown).

A first electrode 30 and a second electrode 33 are employed adjacent to the first ion source 3 and the tip 105 of the gas conduit 104, respectively. A potential difference between the nebulizer tip 20 and first electrode 30 creates an electric field that produces the charged aerosol at the tip, while the potential difference between the second electrode 33 and the conduit 37 guides the ions toward the conduit. A corona or high pressure glow discharge is produced by a high electric field at the corona needle 14; this electric field is produced predominately by the potential difference between corona needle 14 and conduit 37, with possibly some influence exerted by the potential at the second electrode 33. By way of illustration and not limitation, a typical set of potentials on the various electrodes could be: nebulizer tip 20 (ground); first electrode 30 (−1 kV); second electrode 33 (ground); corona needle 14 (+3 kV); conduit 37 (−4 kV); conduit 5 (−3.5 kV). These example potentials are for the case of positive ions; for negative ions, the signs of the potentials are reversed. The electric field between first electrode 30 and second electrode 33 is decelerating for positively charged ions and droplets so the sweep gas is used to push them against the field and ensure that they move through second electrode 33. The flow of the assist gas 100 through the conduit 104 can be optimized for sensitivity based on the flow of the liquid sample 21, for example, between 0.1 to 20 l/min.

Since the electric fields are produced by potential differences, the choice of absolute potentials on electrodes is substantially arbitrary as long as appropriate potential differences are maintained. As an example, a possible set of potentials could also be: nebulizer tip 20 (+4 kV); first electrode 30 (+3 kV); second electrode 33 (+4 kV); corona needle 14 (+7 kV); conduit 37 (ground); conduit 5 (+500V). Choices of potentials, though arbitrary, are usually dictated by convenience and by practical aspects of instrument design.

FIG. 2 shows another embodiment of a multimode source according to the present invention that includes multiple APCI corona needles for generating discharges. In the embodiment depicted, there are two different corona needles 14 and 14*a*. The needle 14*a* may be positioned so as to ionize the additional assist gas 100 which flows in proximity to the corona needle 14*a*, while needle 14 is positioned so as to ionize the environment 101 outside the opening of the conduit 104 (i.e. internal volume of the chamber 10) that is filled with the mixture of the evaporated sample flow 21, additional assist gas 100 and the sweep gas. This dual ionization can provide additional flexibility and more universal ionization function. The corona needles 14 and 14*a* can be connected to a single or to separate power supplies. In the case of a single power supply, the needles 14, 14*a* may have individual current limiting buffer resistors or circuits. It is recognized that other discharge devices can be used in the context of the present invention.

FIGS. 3A, 3B, 3C and 3D show schematically example implementations of corona needles that may be used in the context of the present invention.

Figure 3A:
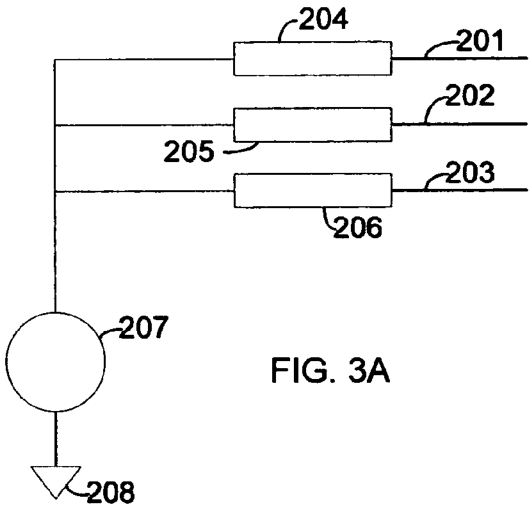
FIG. 3A shows an exemplary embodiment of a corona needle device that may be used in the context of the present invention that includes multiple corona discharge needles.

FIG. 3A illustrates three individually corona discharge needles 201, 202. 203 with a single ballasted DC power supply. The needles 201, 202, 203 are connected to DC power supply 207 through the ballast resistors 204, 205, 206. The other side of the power supply 207 may be grounded 208. A typical voltage range for the power supply 207 may be 2 kV to 20 kV.

Figure 3C:
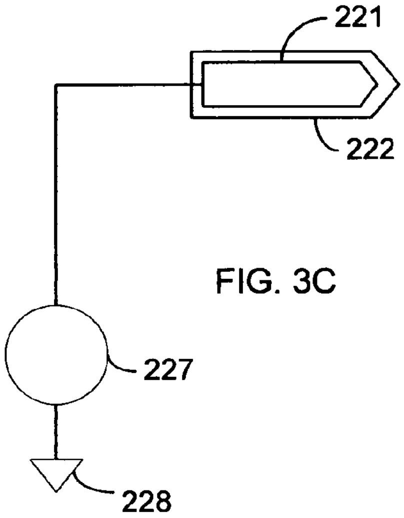
FIG. 3C shows another exemplary embodiment of a corona needle device according to the present invention that includes an electrode needle surrounded by a dielectric layer.
Figure 3B:
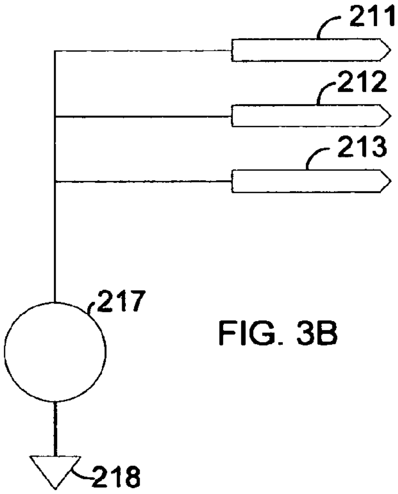
FIG. 3B shows another exemplary embodiment of a corona needle device according to the present invention that includes multiple high resistance needles with a ballasted power supply.

FIG. 3B also shows a discharge device with multiple needles ballasted using a single DC power supply. The needles 211, 212, 213 are connected to DC power supply 217. In this case the needles 211, 212, 213 themselves are made or coated out of high resistant material to insure current limited discharge. The other side of the DC power supply 217 may be grounded 218 similarly to the embodiment shown in FIG.3A. It is also possible to increase the stability of the discharge using DC power supply 217 in the pulsed mode, e.g. by switching it on and off with duration short with respect to time scales for growth of instabilities, for example, from 10 Hz to 50 kHz.

FIG. 3C shows a single corona needle comprising a dielectric layer 222 around an electrode needle 221 that provides a large volume high pressure glow discharge with a low frequency high voltage RF power supply. The needle 221 is surrounded by the dielectric layer 222 while power supply 227 typically operates at frequencies of about 1 to 50 kHz with a voltage about 1 kV. The other side of the power supply 228 may be grounded similar to the embodiment illustrated on FIG. 3A. The dielectric layer 222 can be made out of Teflon or any other inert plastic, for example. The electrode 221 may made out of metal but also can be made out of other conductive or resistive materials.

Figure 3D:
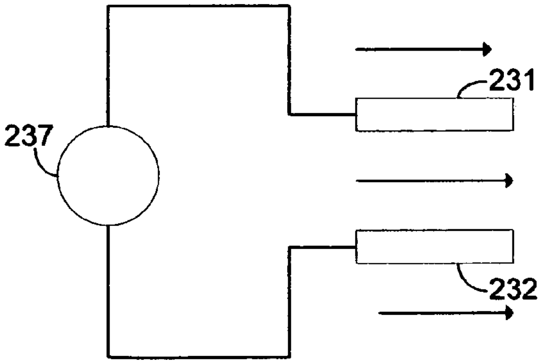
FIG. 3D shows another exemplary embodiment of a corona needle device according to the present invention that includes a pair of plate electrodes.

FIG. 3D shows a discharge device including two parallel plate electrodes 231, 232 that may also be utilized to provide large volume high pressure glow discharge with a high frequency high voltage RF power supply. In this case, a discharge is generated between plates 231 and 232 by connecting them to the RF power supply 237 having an example frequency of 10 mHz and an example voltage of 1 kV.

Figure 4:
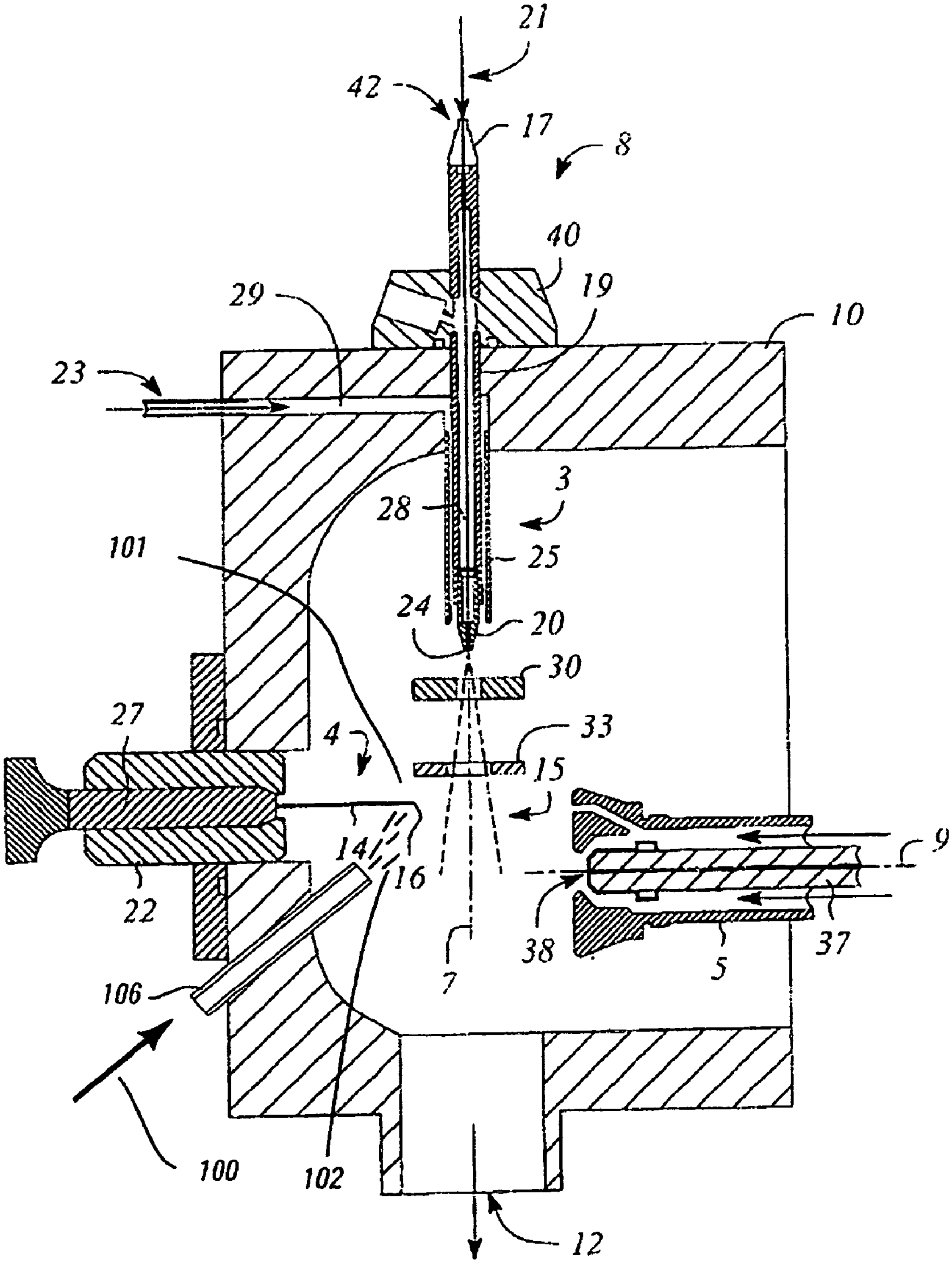
FIG. 4 shows another exemplary embodiment of a multimode ion source according to the present invention in which a conduit is arranged asymmetrically with respect to a corona needle for the introduction of assist gas.

FIG. 4 shows another embodiment of a multimode source according to the present invention in which an assist gas conduit 106 is arranged asymmetrically with respect to the corona needle 14 for the introduction of the assist gas 100 in the area 102 adjacent to the corona needle.

Figure 5:
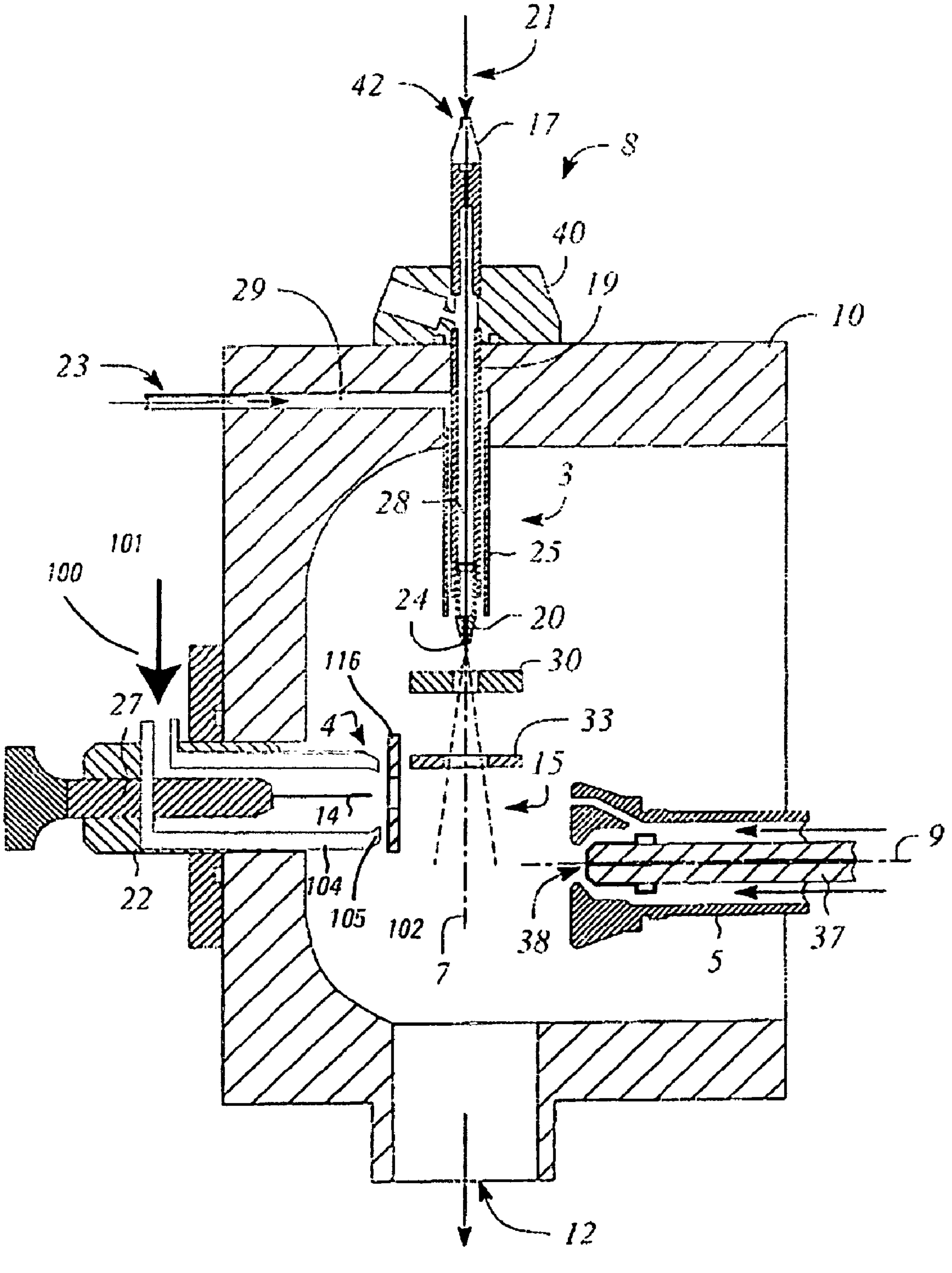
FIG. 5 shows another exemplary embodiment of a multimode ion source according to the present invention that includes an additional electrode element.

FIG. 5 shows another embodiment of a multimode source according to the present invention that includes an additional lens electrode element 116. By varying voltage on lens electrode element 116 it is possible to further optimize sensitivity and ion production in the ion source.

In terms of operation, an embodiment of a method of producing ions using a multimode ionization source according to the present invention comprises producing a charged aerosol by a first atmospheric pressure ionization source such as an electrospray ionization source; drying the charged aerosol produced by the first atmospheric pressure ionization source; adding an assist gas such as a noble gas in the area around the second APCI ion source, ionizing the charged aerosol using a APCI ionization source and detecting the ions produced from the multimode ionization source. Referring again to FIG. 1, the sample 21 is provided to the first ion source 3 by means of the nebulizer inlet 42 that leads to the longitudinal bore 28. The sample 21 may comprise any sample that is under investigation. The nebulizer conduit 19 has a longitudinal bore 28 that is used to carry the sample 21 toward the nebulizer tip 20. The drying device 23 may introduce a sweep gas into the ionized sample through the sweep gas conduit 25. The sweep gas conduit 25 surrounds or encloses the nebulizer conduit 19 and ejects the sweep gas to nebulizer tip 20. The aerosol that is ejected from the nebulizer tip 20 is then subject to an electric field produced by the first electrode 30 and the second electrode 33. The second electrode 33 provides an electric field that directs the charged aerosol toward the conduit 37. However, before the charged aerosol reaches the conduit 37 it is first subjected to the second ion source 4. The second ion source 4 shown in FIG. 1 is an APCI ion source with the concentric addition of the assist gas. FIG. 2 shows two corona needles used within APCI source and FIG. 4 shows a non-concentric assist gas introduction.

As noted previously, the assist gas is preferably is a noble gas, although other gases may be used to amplify the detection efficiency. Noble gases have ionization potentials higher then most of the other typical analyzed samples therefore they can ionize most of the analyzed samples by energetic transfer once they are energetically excited. One of the reasons for the efficacy of this ionization mechanism is that the excited atoms are neutral, and do not repel one another. Thus, they can accumulate in large concentration in a localized area leading to very rapid ionization of the solvents and analytes that flow into this area. Another ionization mechanism that may come into play includes proton transfer from the eluent solvent.

It is noted that the scope of the invention should also not be interpreted as being limited to the simultaneous application of the first ion source 3 and the second ion source 4. Although this is an advantageous feature of the present invention, it is contemplated that the first ion source 3 can also be turned "on" or "off" as can the second ion source 4. Thus, the sole ESI ion source may be used with or without the gas assisted APCI device.

Figure 6:
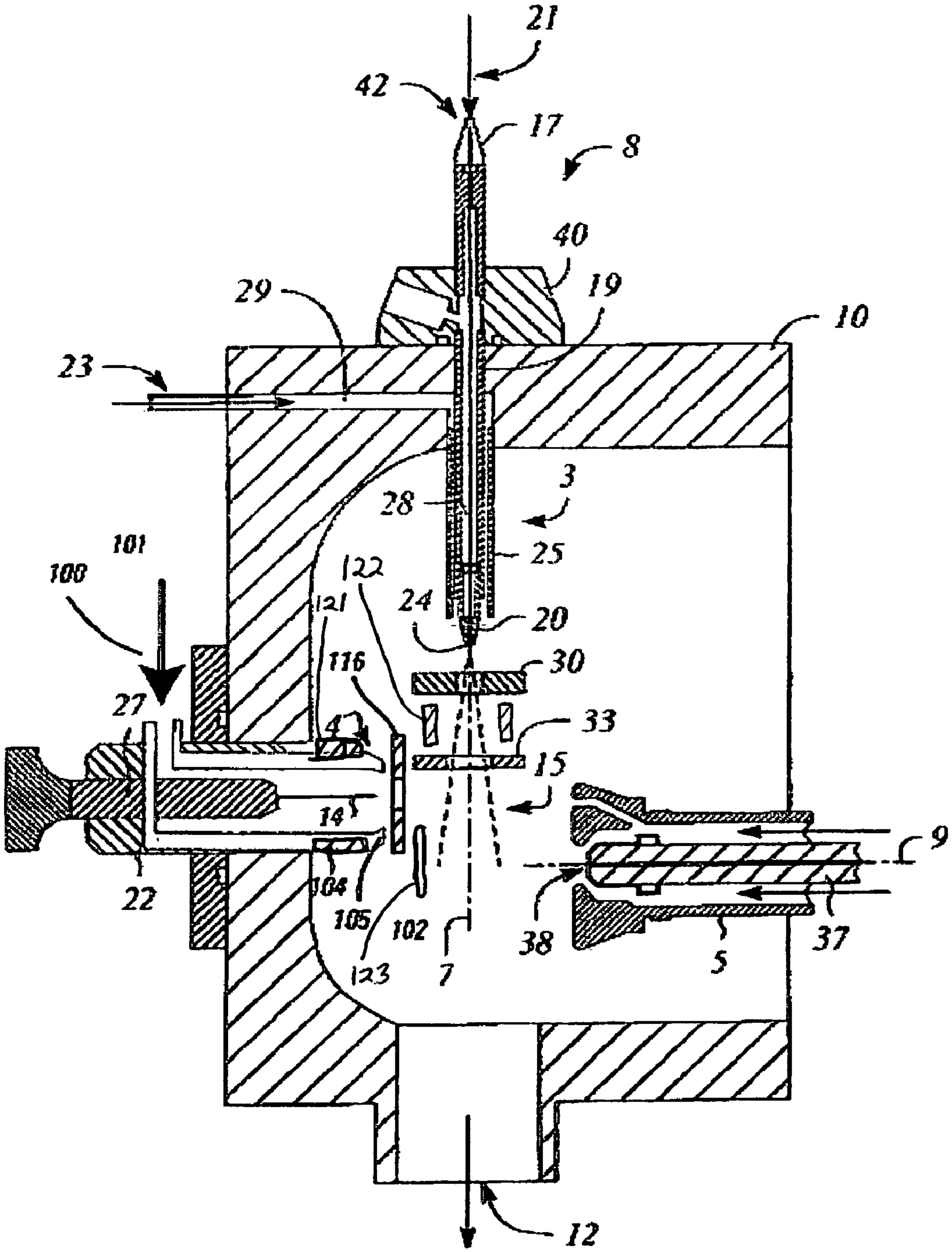
FIG. 6 shows another exemplary embodiment of a multimode ion source according to the present invention including multiple heating elements.

It is also noted that drying or increasing the temperature of the sample aerosol may contribute to the improved ionization efficiency for the ion source of the present invention. Therefore, it may be beneficial to use one or several heating elements within the ionization chamber. FIG. 6 shows an exemplary embodiment of a multimode source according to the present invention including several heating elements 121, 122,123. The concentric heater 121 is used to preheat the gas 101 around the discharge needle 14. The heater 123 may be an infrared heater, which is used to heat content inside the ionization chamber. The concentric heater 122 is positioned so as to directly heat the sample aerosol. It is also possible to use fewer heating elements to achieve similar performance. The heating elements can also be of different shapes, types and orientation and may include suitable temperature control elements such as thermocouples.

Having described the present invention with regard to specific embodiments, it is to be understood that the description is not meant to be limiting since further modifications and variations may be apparent or may suggest themselves to those skilled in the art. It is intended that the present invention cover all such modifications and variations as fall within the scope of the appended claims.

What is claimed is:

1. A multimode ionization source comprising:

a) an electrospray ionization source for providing a charged aerosol;

b) an atmospheric pressure chemical ionization (APCI) source including a corona needle having an end positioned downstream from the electrospray ionization source for producing a discharge that further ionizes the charged aerosol;

c) an assist gas inlet positioned adjacent to the corona needle for providing assist gas, the assist gas facilitating ionization of the charged aerosol by the discharge; and d) a conduit having an orifice for receiving ions from the charged aerosol.

2. The multimode ionization source, further comprising:

e) a drying device adjacent to the electrospray ionization source for drying the charged aerosol.

3. The multimode ionization source of claim 1, wherein the assist gas comprises a noble gas.

4. The multimode ionization source of claim 1, wherein the assist gas inlet provides assist gas symmetrically and concentrically around the end of the corona needle.

5. The multimode ionization source of claim 1, wherein the corona needle comprises multiple corona discharge needles.

6. The multimode ionization source of claim 1, wherein the assist gas inlet provides assist gas non-concentrically with respect to the end of the corona needle.

7. The multimode ionization source of claim 6, wherein the assist gas inlet is positioned on a downstream side of the corona needle.

8. The multimode ionization source of claim 1, further comprising:

an electrode positioned adjacent to the end of the corona needle for directing ions toward the conduit.

9. The multimode ionization source of claim 1, further comprising:

a heating element concentrically surrounding the corona needle for preheating gas around the corona needle.

10. The multimode ionization source of claim 1, further comprising:

a heating element positioned between the corona needle and the conduit.

11. A mass spectrometer comprising:

i) a multimode ionization source comprising:

a) an electrospray ionization source for providing a charged aerosol;

b) an atmospheric pressure chemical ionization (APCI) source including a corona needle having an end positioned downstream from the electrospray ionization source for producing a discharge that further ionizes the charged aerosol;

c) an assist gas inlet positioned adjacent to the corona needle for providing assist gas, the assist gas facilitating ionization of the charged aerosol by the discharge; and d) a conduit having an orifice for receiving ions from the charged aerosol;

ii) a mass analyzer positioned at a downstream end of the conduit and receiving ions therefrom; and iii) a detector downstream from the mass analyzer for detecting ions received from the mass analyzer.

12. The mass spectrometer of claim 11, wherein the assist gas comprises a noble gas.

13. The mass spectrometer of claim 11, wherein the multimode ionization source further comprises a drying device adjacent to the electrospray ionization source for drying the charged aerosol.

14. The mass spectrometer of claim 11, wherein the assist gas inlet provides assist gas symmetrically and concentrically around the end of the corona needle.

15. The mass spectrometer of claim 11, wherein the corona needle comprises multiple corona discharge needles.

16. The mass spectrometer of claim 11, wherein the assist gas inlet provides assist gas non-concentrically with respect to the end of the corona needle.

17. A method of producing ions using a multimode ionization source comprising:

a) producing a charged aerosol by electrospray ionization;

b) guiding the charged aerosol downstream using electrodes;

c) providing an assist gas in the vicinity of a corona needle downstream from the electrodes; and d) ionizing the charged aerosol using with a discharge from the corona needle facilitated by the assist gas.

18. The method of claim 17, further comprising:

e) drying the aerosol produced by the electrospray ionization.

19. The method of claim 17, wherein the assist gas comprises a noble gas.

20. The method of claim 17, further comprising:

heating the assist gas.

21. The method of claim 17, wherein the assist gas is provided around the corona needle symmetrically and concentrically.

22. The method of claim 17, wherein the corona needle comprises multiple corona needles.

23. An ion source for a mass spectrometer comprising:

a corona needle positioned to create a discharge in proximity to a stream of analytes; and an assist gas inlet positioned adjacent to the corona needle for providing assist gas, the assist gas facilitating ionization of the analytes by the corona needle discharge.

* * * * *